US012688623B1

(12) United States Patent
Makansi et al.

(10) Patent No.: US 12,688,623 B1
(45) Date of Patent: Jul. 21, 2026

(54) IDENTITY MANAGEMENT IN IMAGE GENERATION

(71) Applicant: Amazon Technologies, Inc., Seattle, WA (US)

(72) Inventors: Osama Makansi, Nufringen (DE); Amit Kumar Agrawal, Santa Clara, CA (US); Oleksandr Vorobiov, Albstadt (DE)

(73) Assignee: Amazon Technologies, Inc., Seattle, WA (US)

( * ) Notice: Subject to any disclaimer, the term of this patent is extended or adjusted under 35 U.S.C. 154(b) by 70 days.

(21) Appl. No.: 18/622,014

(22) Filed: Mar. 29, 2024

(51) Int. Cl.
| | |
|---|---|
| *G06T 11/10* | (2026.01) |
| *G06T 5/73* | (2024.01) |
| *G06T 9/00* | (2006.01) |
| *G06V 40/16* | (2022.01) |

(52) U.S. Cl.
CPC .............. *G06T 11/10* (2026.01); *G06T 5/73* (2024.01); *G06T 9/00* (2013.01); *G06V 40/169* (2022.01); *G06T 2207/20081* (2013.01); *G06T 2207/30201* (2013.01); *G06T 2210/16* (2013.01)

(58) Field of Classification Search
CPC . G06T 11/001; G06T 5/73; G06T 9/00; G06T 2207/20081; G06T 2207/30201; G06T 2210/16; G06V 40/169
See application file for complete search history.

(56) References Cited

U.S. PATENT DOCUMENTS

| | | | | |
|---|---|---|---|---|
| 2009/0262987 A1* | 10/2009 | Ioffe | ..................... | G06T 11/60 |
| | | | | 382/103 |
| 2022/0044006 A1* | 2/2022 | Wang | .................. | G06V 40/172 |

OTHER PUBLICATIONS

Yu, Feng, et al. "VTON-MP: Multi-pose virtual try-on via appearance flow and feature filtering." IEEE Transactions on Consumer Electronics 69.4 (2023): 1101-1113. (Year: 2023).*

* cited by examiner

*Primary Examiner* — Said Broome
*Assistant Examiner* — Andrew Shin
(74) *Attorney, Agent, or Firm* — Knobbe, Martens, Olson & Bear, LLP

(57) ABSTRACT

The present disclosure generally relates to systems and methods for generating images of an approved identity wearing an article of clothing. The image generation system may generate an image of a person with a blurred face wearing a particular article of clothing based on a received clothing image and estimated attributes from an image depicting the face associated with the approved identity. The image generation system may then deblur the face into a sharp face conditioned on the approved identity based on training of limited data with sharp faces. To generate the final output image, the image generation system integrates the deblurred face into the generated image of the first stage.

24 Claims, 9 Drawing Sheets

520 — IMAGE GENERATION ROUTINE

522 — BLUR THE FACE OF AN IMAGE TO CREATE A BLURRED FACE OUTPUT IMAGE

524 — EXTRACT A FACE REGION AROUND THE BLURRED FACE FROM THE BLURRED FACE OUTPUT IMAGE

526 — DEBLUR THE FACE REGION INTO A SHARP REAL FACE CONDITIONED ON THE APPROVED IDENTITY

528 — INTEGRATE THE SHARP REAL FACE INTO THE BLURRED FACE OUTPUT IMAGE

530 — END ROUTINE

IDENTITY MANAGEMENT IN IMAGE GENERATION

BACKGROUND

Generally described, computing devices and communication networks can be utilized to exchange data or information. In a common application, a computing device can request content from another computing device via the communication network. For example, a client having access to a computing device can utilize a software application to request content from a server computing device via the network (e.g., the Internet). In such embodiments, the client's computing device can be referred to as a client computing device, and the server computing device can be referred to as a content provider.

In some applications, the network service provider can instantiate various network-based services that can process client requests for data. One such request may be for the generation of content, such as text, images, and multimedia. The requests may include input text or images that may be used in the generation of the content.

Generative machine learning (ML) models or systems can be trained to generate different types of content, such as text, images, and multimedia. In image generation for fashion, a trained generative ML model may generate images depicting a body wearing an article of clothing, including a face of the body. However, many faces are not legally allowed to be used in the images created by the generative ML model. For example, the ML model may generate an image of a body (including a face) wearing an article of clothing, but the entity generating the face does not have a legal right of usage for that face.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
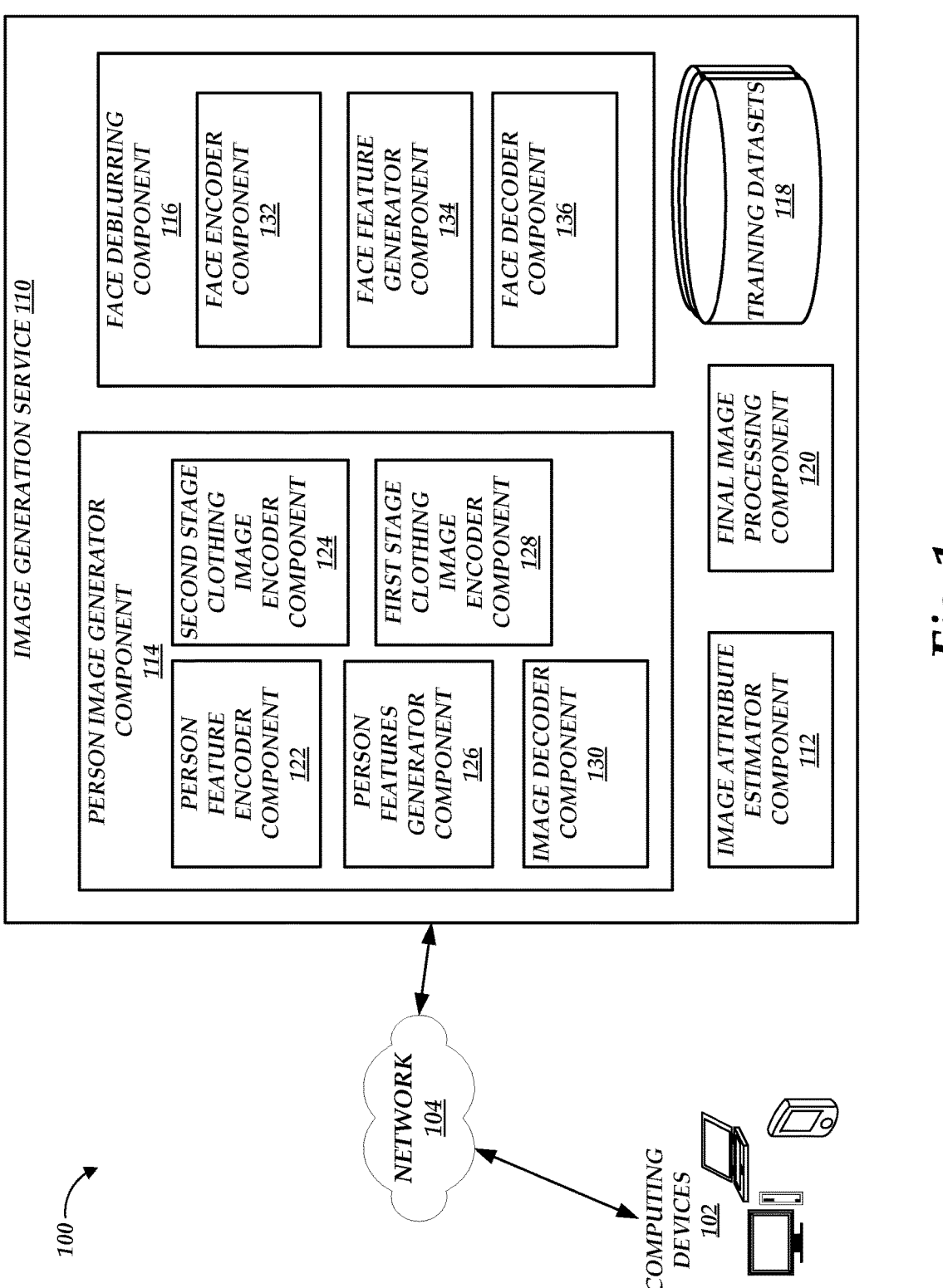
FIG. 1 depicts a block diagram of an environment for an image generation service that includes one or more computing devices and an image generation service.

Generally described, aspects of the present disclosure relate to systems and methods for providing an image generation service incorporating one or more machine-learned algorithms. More specifically, one or more aspects of the present application can include an image generation service that can generate an integrated image depicting a combination of face portion from a first image depicting a face (generally referred to as a "face image") and a second image depicting an article of clothing (generally referred to as a "clothing image"). Illustratively, the face image can correspond to a set of images corresponding to approved rights of usage.

Given a set of clothing images depicting different articles of clothing and a face image, the image generation service can generate a set of images depicting the same face from the face image wearing the clothing from the individual clothing images. Similarly, given a set of face images depicting different faces and a clothing image, the image generation service can generate a set of images depicting different faces from the set of face images wearing the same clothing from the individual clothing image. The image generation service can extract image components useful in representing various aspects of the image using an image processing operation known as morphology.

The image generation service can estimate attributes of the approved face, generate a body with the approved face by generating a body with a blurred face and integrating the deblurred version of the face onto the body to create a final output image. The image generation service may include an image attribute estimator, an image generator module, a face deblurring module, and a final image processing module, which work together to generate the result image(s). The image generation service may receive as input the face image and the clothing image. The image attribute estimator may determine attributes of the face image, which can subsequently be used by the other modules of the service. As part of the image generator module and face deblurring module, the image generation service may execute various encoders and decoders that process the input images and generate images that may be used to generate the result image(s). For example, the image generator module may, using the encoders and decoders, generate a blurred face output image using the estimated attributes from the image attribute estimator and the clothing image. Next, the face deblurring module may, using the encoders and decoders, deblur the face from the deblurred face output image into a sharp real face conditioned on the approved face identity. The sharp face can then be integrated into the blurred face output using the final image processing module to generate the final output image.

In the context of image generation depicting humans and various articles of clothing, one challenge relates specifically to integrating images in which facial features of a face image are utilized. For example, a network provider may be limited in terms of a finite set of face images that are available for use based on contractual restrictions or image rights. Specifically, the network provider may need to integrate facial images from the finite set of face images due to licensing restrictions. Accordingly, given the limited number of face images, the network service provider would be challenged to integrate individual face images (including its default sizing and other attributes) with clothing images depicting different articles of clothing, model sizes, or other desired attributes. In view of operational parameters including a wide dynamic of attributes of the clothing image and a desire to maintain the attributes of the face images during the integration, traditional image processing or manipulation techniques are inefficient in terms of not generating sufficient quality integrated images or incorrect images. Such approaches can also be inefficient in terms of processing resources consumed or otherwise require significant manual processing.

Aspects of the present disclosure address the above-mentioned challenges as well as other potential challenges in accordance with an image generation service that can generate an image based on the integration of selected face images with an approved/selected identity and a clothing image depicting an article of clothing. The models described herein may be trained using two data sources. One data source shows biometrics data (e.g., the face) while the other data source does not show biometric data (e.g., the face in the image is blurred out). For the data source that does not show biometric data, a large dataset of images with all faces blurred out to remove the identity may be used. For the data source that does show biometrics data, there may be a collected image dataset with a number of different identities that have a legal right of usage. The dataset may include images containing head-shots of each identity depicted in various poses as well as full-body images of the identity.

Generally described, aspects of the process for the image generation service to generate the image may illustratively correspond to a multi-step approach. In a first step, an image generator model receives as inputs a clothing image depicting an article of clothing and additional attributes corresponding to desired characteristics of the generated image. Illustratively, the additional attributes can include body parts of a model wearing the article of clothing and indicating the pose, skin tone (estimated from an image depicting a selected face image), etc. of the body in the generated image. The output of the image generator model can include a clothing image depicting a person wearing the clothing from the clothing image with a blurred face. The clothing details from the clothing image may be preserved in the generated image. The image generator model may include the use of various encoders that encode data into a latent space for processing and then can be decoded as the outputted image. The encoders of the image generator model in this first step may be trained on all data in a training dataset with blurred faces for full biometric safety.

The image generation service can run semantic segmentation to extract the face region from the output image, including a few pixels around the face for further context. The extracted face region can be used as input to a face deblurring model.

In a second illustrative step, the face deblurring model can deblur the extracted face from stage one into a sharp real face conditioned on a selected face image. The face deblurring model may include the use of various encoders that encode data into a latent space for processing and then can be decoded as the outputted image. The encoders of the face deblurring model may be trained on limited data with sharp faces that are associated with approved identities to avoid the model learning from unapproved identities.

Following the above-described two steps, in a third step, the image generation service can integrate the deblurred face from the face deblurring model into the generated image from the image generator model to generate the final output image containing the approved model wearing the article of clothing.

Turning now to the figures, FIG. 1 is a block diagram depicting an illustrative computing environment 100 in which an image generation service 110 can generate an image depicting a selected face image combined with a body wearing a desired article of clothing. The image generation service 110 includes an image generator component 114, a face deblurring component 116, an image attribute estimator component 112, a final image processing component 120, and one or more training datasets 118. The image generator component 114 can generate an image of a person wearing the designated article of clothing with a blurred face. The face deblurring component 116 can deblur the face from the output of the image generator component 114 into a sharp real face conditioned on the selected face image identity. The image attribute estimator component 112 can generate associated attributes of the face from the selected face image. The final image processing component 120 can integrate the deblurred face from the face deblurring component 116 into the output image from the image generator component 114. The training datasets 118 may include training data that may be used by the image generation service 110 to train the various models described herein. Although the training datasets 118 are depicted in FIG. 1 as included within the image generation service 110, it will be appreciated that in other embodiments, the training datasets 118 may be stored separately from and remotely accessed by the image generation service 110 (e.g., via a network 104).

The training datasets 118 may contain two different sources of data. The first source of data may show biometrics data (e.g., a face), and the second source of data may not show biometric data (e.g., image with blurred faces). In one embodiment, for the latter, the image generator component 114 may be trained using images collected from a large dataset, such as images collected from online studios (e.g., JFK13, DEL19, LHR17, HDN14, Shopbop) and from online catalogs (e.g., ww-detail), with all faces being blurred to remove the identity. For the former, the face deblurring component 116 may be trained using a collected image dataset with a number of different identities, with a number of images per identity to show different poses, expressions, and the like of the identity. For example, there may be a certain number of head-shot images and a certain number of full-body images associated with each identity.

Computing device(s) 102 (hereinafter referred to as "computing devices 102" for ease of reference) illustratively correspond to any computing device that provides a means for a user to interact with components of the image generation service 110. Computing devices 102 may include user interfaces or dashboards that connect a user with a machine, system, or device. In various implementations, computing devices 102 include computer devices with a display and a mechanism for user input (e.g., mouse, keyboard, voice recognition, touch screen, and/or the like). For example, the computing devices 102 include a desktop, tablet, e-reader, server, wearable device, laptop or tablet computer, smartphones, gaming consoles, personal digital assistants (PDAs), hybrid PDA/mobile phone, mobile phone, electronic book reader, set-top box, voice command device, camera, digital media player, and the like. The computing devices 102 can access a cloud provider network via the network 104 to view or manage their data and computing resources, as well as to use websites and/or applications hosted by the cloud provider network. Elements of the cloud provider network may also act as clients to other elements of that network. Thus, computing devices 102 can generally refer to any device accessing a network-accessible service as a client of that service.

The components of the image generation service 110 may be communicatively coupled via a network 104. The network 104 can include any appropriate network, including wired network, wireless network, or combination thereof. For example, network 104 may be a personal area network, local area network, wide area network, cable network, satellite network, cellular network, or any other such network or combination thereof. As a further example, the network 104 may be a publicly accessible network of linked networks, possibly operated by various distinct parties, such as the Internet. Protocols and components for communicating via the Internet or any other types of communication networks are known to those skilled in the art of computer communications and thus, need not be described in more detail herein. In various embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, C-band, mmWave, sub-6 GHz, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications and thus, need not be described in more detail herein.

In various implementations, the network 104 can represent a network that may be local to a particular organization, e.g., a private or semi-private network, such as a corporate or university intranet. In some implementations, devices communicate via the network 104 without traversing an external network, such as the Internet. Devices connected via the network 104 in this case may be walled off from accessing the Internet. As an example, the network 104 may not be connected to the Internet. Accordingly, e.g., the computing devices 102 may communicate with the image generation service 110 directly (via wired or wireless communications) or via the network 104, without using the Internet. Thus, even if the network 104 or the Internet is down, the image generation service 110 may continue to communicate and function via direct communications (and/or via the network 104).

Part of the image generation service 110 can include the image generator component 114. The image generator component 114 may perform, at least in part, portions of the first step of the image generation process by generating an image of a person wearing the designated article of clothing with a blurred face. The image generator component 114 may include the use of various encoders that are ML models that encode data into a latent space for processing, such as a person feature encoder component 122, a person features generator component 126, a second stage clothing image encoder component 124, a first stage clothing image encoder component 128, and then can decode the data as the outputted image, using a image decoder component 130. The processing steps of the image generator component 114 will be described in further detail below with respect to FIG. 3A-B.

Figure 3A:
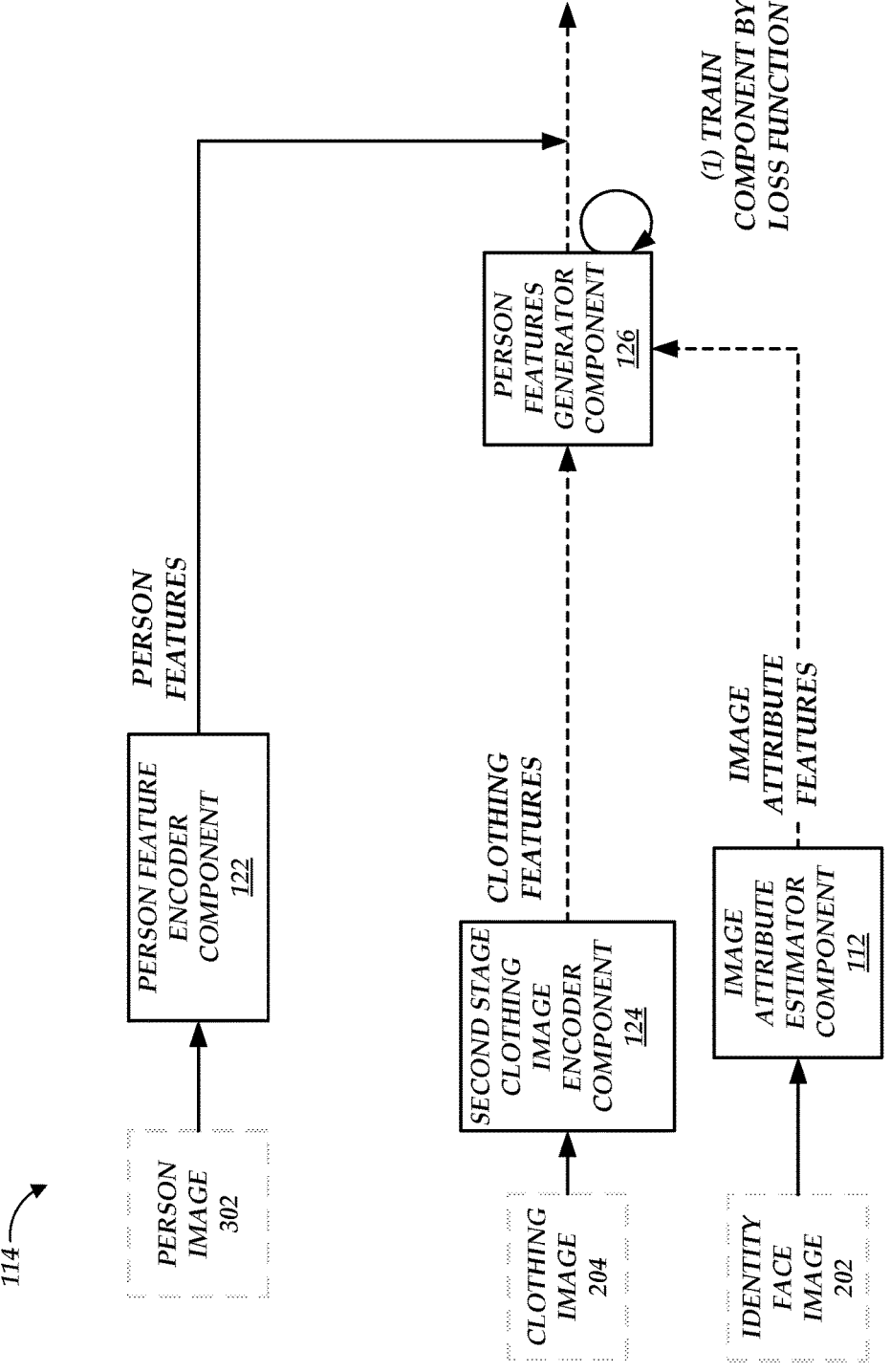
FIG. 3A is a visualization of the environment of FIG. 1 depicting illustrative interactions between the components of an image generator component to order to train the image generator component, in accordance with aspects of the present application.

The person feature encoder component 122 is a ML model that can take as input a clothing image, such as the clothing image 204 of FIG. 3A, and encode the clothing image into a latent space (e.g., an encoded space) in order to generate person features from the image, where the output is in the latent space. The latent space may be a multi-dimensional space that includes encodings (e.g., multi-dimensional vectors) where similar encodings are positioned closer to each other in the latent space. Therefore, the person feature encoder component 122 can generate an encoding in the latent space representing the clothing image. A point in the latent space can then be sampled from the encoding of the clothing image to extract person features, which can be used later in the decoding process. The person feature encoder component 122 may be a deep generative model, such as a variational autoencoder (VAE).

Figure 2:
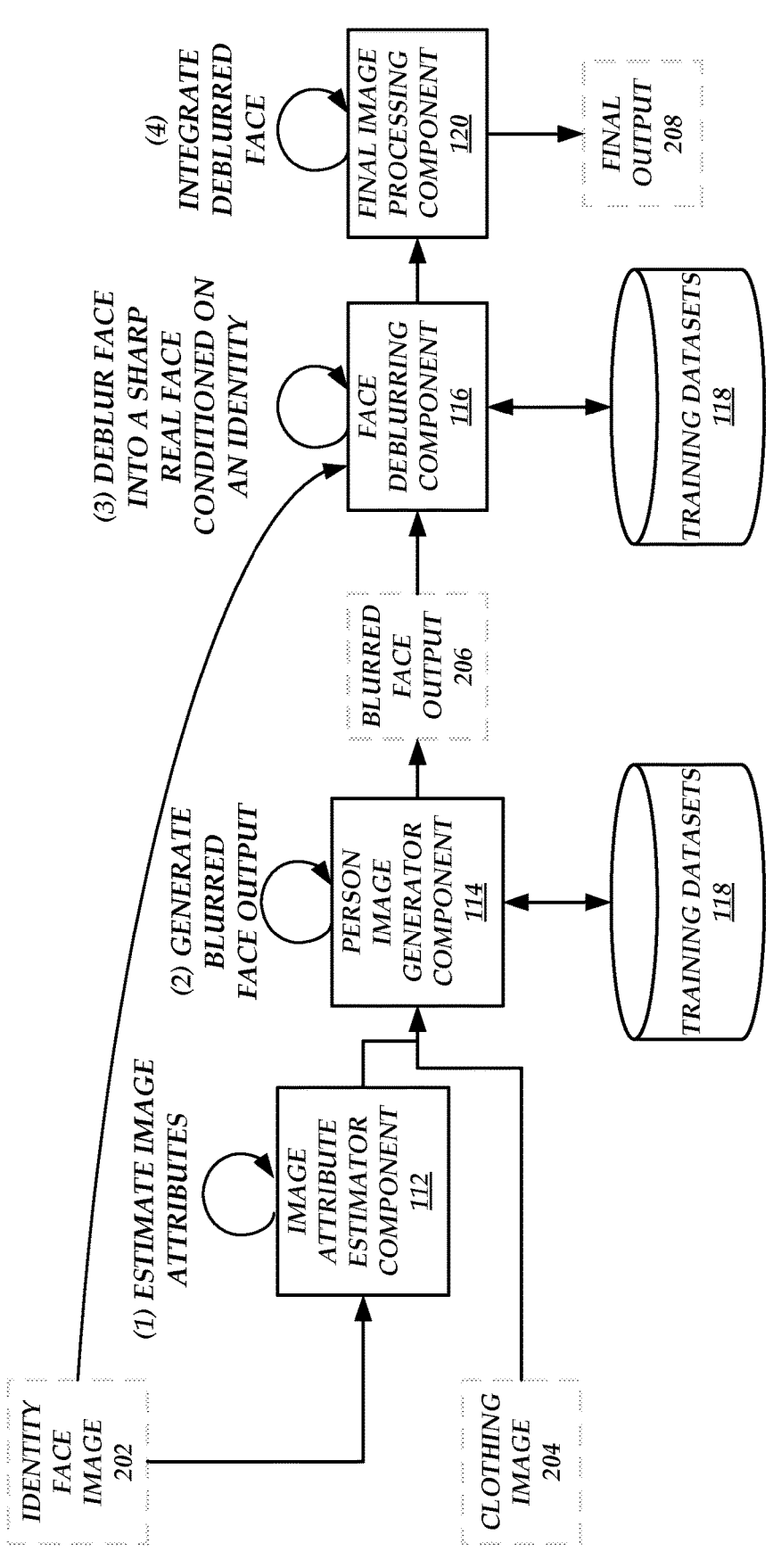
FIG. 2 is a visualization of the environment of FIG. 1 depicting illustrative interactions between the components of the image generation service for generating an image conditioned on an approved identity in accordance with aspects of the present application.

The second stage clothing image encoder component 124 is another ML model that can take as input a clothing image, such as clothing image 204 of FIG. 2, encode the clothing image into the latent space, and extract features, such as the shape of the clothing, of the article of clothing from the image, where the features are outputs of the second stage clothing image encoder component 124 encoded in the latent space. The extracted features may be used, in addition to input features, such as skin tone, to condition the person features generator component 126. The person features generator component 126 may be a type of convolutional neural network (CNN), such as a U-Net. The person features generator component 126 can generate features of the person according to the clothing shape and input attributes. The attributes may be input from an end-user or may be generated as output from the image attribute estimator component 112. The image attribute estimator component 112 can take as input an image of a face and generate the associated attributes of the face from the image. For example, the image attribute estimator component 112 may estimate the skin tone of the face in the image and output an estimated RGB skin tone.

The first stage clothing image encoder component 128 is a ML model that can take as input the same clothing image and extract features of the clothing from the image, such as the details of the clothing itself, where the features are outputs of the first stage clothing image encoder component 128 encoded in the latent space. The first stage clothing image encoder component 128 can output skip connections that ensure that clothing details are preserved.

The output from the person feature encoder component 122, the person features generator component 126, and the first stage clothing image encoder component 128 may be used as input to the image decoder component 130. The image decoder component 130 is a ML model that can be used to decode the encoded data from the encoder models as the outputted image. Using the person features and skip connections from the previously described components, the image decoder component 130 can decode these features in order to generate an output image, such as the blurred face output image 206 of FIG. 3B described below. The image decoder component 130 may be a VAE decoder.

Another part of the image generation service 110 may be the face deblurring component 116. The face deblurring component 116 may include the use of various encoders, including the face encoder component 132 and the face feature generator component 134, that encode data into a latent space for processing and then can be decoded as the outputted image using the face decoder component 136. The face deblurring component 116 can deblur the face from the output of the image generator component 114 into a sharp real face conditioned on an approved identity. The face deblurring component 116 includes a face encoder component 132, a face feature generator component 134, and a face decoder component 136. The face encoder component 132 is a ML model that can encode a sharp face image and a blurred face image into a latent space. The face feature generator component 134 is a ML model that encodes face features from blurred face features and identity features of the selected face image. The face decoder component 136 can decode the features from the latent space into a generated image. Further details of the face deblurring component 116 will be described in further detail below with respect to FIG. 4A-B.

Figure 4A:
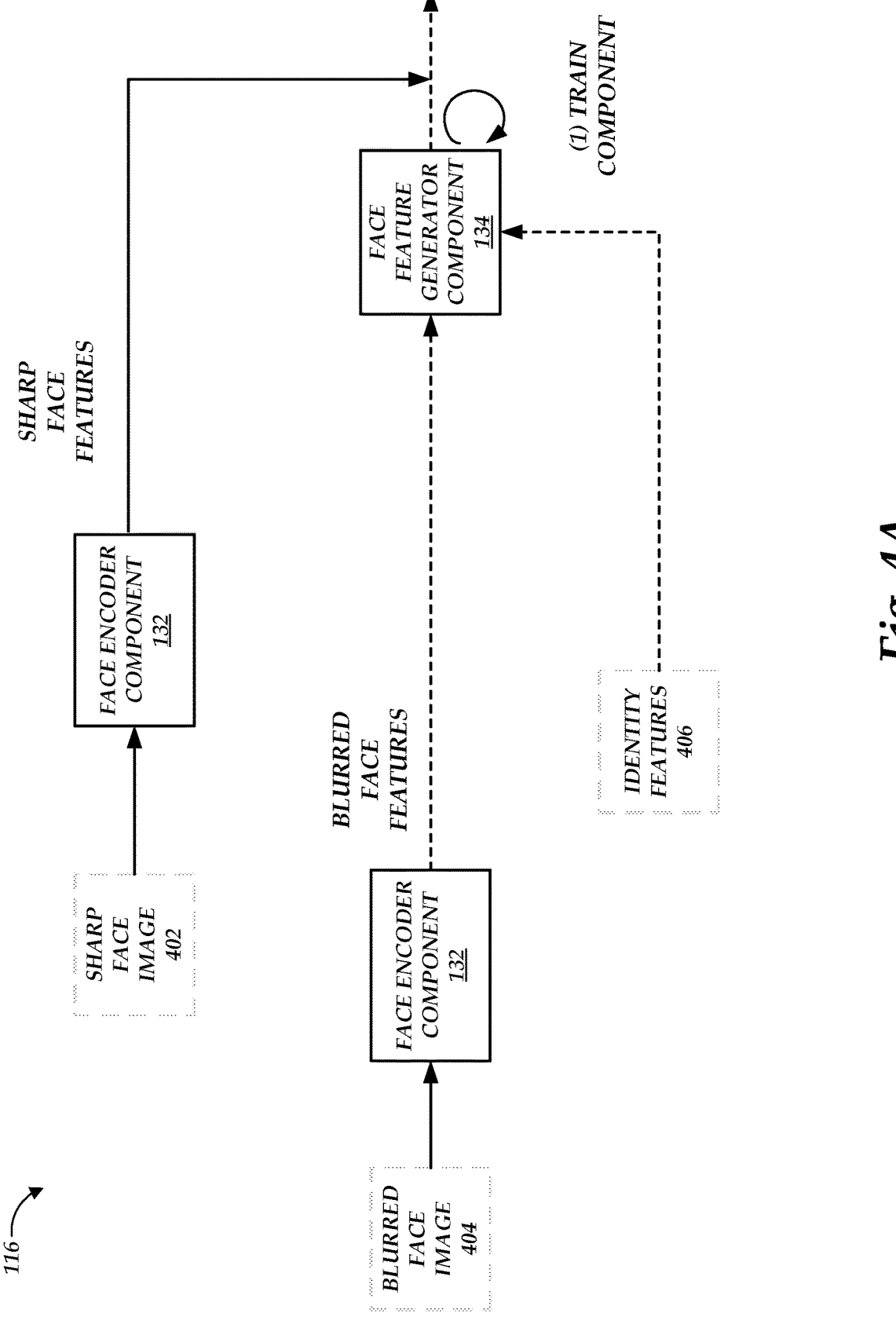
FIG. 4A is a visualization of the environment of FIG. 1 depicting illustrative interactions between the components of a face deblurring component to order to train the face deblurring component, in accordance with aspects of the present application.

The face encoder component 132 may first take as input a sharp face image, such as the sharp face image 402 of FIG. 4A and can encode the sharp face image into the latent space, similar to the person feature encoder component 122 described above. The face encoder component 132 may next take as input a blurred face image, such as the blurred face image 404 of FIG. 4A and can encode the blurred face image into the latent space as well. Using a sampling process similar to the person feature encoder component 122 described above, the face encoder component 132 can extract sharp face features and blurred face features from the respective input images. The face encoder component 132 may be a deep generative model, such as a variational autoencoder (VAE).

The blurred face features from the face encoder component 132 and identity features, such as the identity features 406 of FIG. 4A, can be used as a condition to the face feature generator component 134, which can deblur the features into features of a sharp face. The resulting features, along with the sharp face features from the face encoder component 132, can then be passed to the face decoder component 136 in order to decode the features and generate a deblurred face image corresponding with the input identity. The face feature generator component 134 may be a type of convolutional neural network (CNN), such as a U-Net. The face decoder component 136 may be a VAE decoder.

Once the image generation service 110 has the outputs of the image generator component 114 and the face deblurring component 116, the final image processing component 120 can integrate the deblurred face from the face deblurring component 116 into the output image from the image generator component 114. The integrated image from the final image processing component 120 results in the final output image, such as the final output 208 of FIG. 2, that depicts the approved identity wearing the article of clothing. In one embodiment, the dimensions of the deblurred face are adjusted to fit the dimensions of the face region of the blurred face output.

FIG. 2 is a visualization of the environment of FIG. 1 depicting illustrative interactions between the components of the image generation service 110 for generating an image conditioned on an approved identity in accordance with aspects of the present application. At (1), the image attribute estimator component 112 estimates attributes from the identity face image 202. The identity face image 202 may depict an image of the face of the selected face image. The image attribute estimator component 112 may estimate from the face various attributes associated with the face. For example, attributes from the face may include color (e.g., RGB skin tone), texture, or shape of the face. However, in one embodiment, the attributes may be input directly to the model (e.g., by an end user or client).

In one embodiment, the approved identity may be selected by an end user. However, in another embodiment, the approved identity may be selected by the system on an automated or random basis.

At (2), the image generator component 114 can generate a blurred face output 206. The image generator component 114 can take as input the estimated attributes of the identity face image 202 from the image attribute estimator component 112 and a clothing image 204. The clothing image 204 may depict the article of clothing that will be generated with the selected approved identity. The blurred face output 206 may be an image of a person wearing the clothing from the clothing image 204 with a blurred face. Here, the image generator component 114 can preserve the details of the clothing from the clothing image 204 and maintain the attributes of the face from the image attribute estimator component 112. For example, the image attribute estimator component 112 may estimate that the face from the identity face image 202 has a certain skin tone and therefore, the blurred face output 206 may maintain that same skin tone in the image. In one embodiment, the image generator component 114 may be trained on data with blurred faces, such as the data contained within the training datasets 118, to ensure full biometric safety.

At (3), the face deblurring component 116 can deblur the extracted face region from the blurred face output 206 into a sharp real face conditioned on the approved identity. The face deblurring component 116 may run semantic segmentation to extract the face region, including the few pixels around the face for context, from the blurred face output 206. Therefore, the resulting image is a clear image of a selected face image. The face deblurring component 116 may be trained on sharp faces (e.g., limited images associated with a certain number of specific identities), such as the data contained within the training datasets 118. In one embodiment, the image generator component 114 and the face deblurring component 116 may be latent diffusion models (LDM) with each having two stages: variational autoencoder (VAE) and U-Net.

Finally, at (4) the final image processing component 120 can integrate the deblurred face from the face deblurring component 116 into the generated image of the image generator component 114, the blurred face output 206. The integrated image results in a final output 208, depicting a body with the selected face from the identity face image 202 wearing the article of clothing in the clothing image 204. In some embodiments, the image generation service 110 may generate images with variations in hair style, face pose, face expressions, body size, body shape, and the like.

In some embodiments, the image generation service 110 may calculate a face similarity of the face in the final output 208 and the face image 202. For example, the face similarity may be AWK Reko. In some embodiments, the image generation service 110 may reject final outputs 208 with a face similarity below a certain threshold. For example, face similarities below 99% may be rejected. In some embodiments, the face similarity can also be provided as representative of a confidence value for the final output 208.

In some embodiments, the face deblurring component 116 may be implemented without receiving additional or pre-established inputs such that the image generation service 110 can change the face of the image while keeping the rest of the image the same (e.g., body, hair, clothing, background, etc.). In this case, the final output 208 can be generated without running the image generator component 114. In particular, given the clothing image 204, the face deblurring component 116 can blur, segment, and crop the face. The resulting image is run through the face deblurring component 116 to generate a sharp face that can be integrated into the input image (e.g., the clothing image 204). This method may be beneficial as to reduce inference and training time, as well as maintain the original quality of the rest of the body of the image (e.g., skin and hair).

In some embodiments, the image generation service 110 may generate novel identities. For example, the image generation service 110 may generate novel identities (e.g., no identity preservation) when the attributes from the identity face image 202 are very different from the input attributes.

Figure 3B:
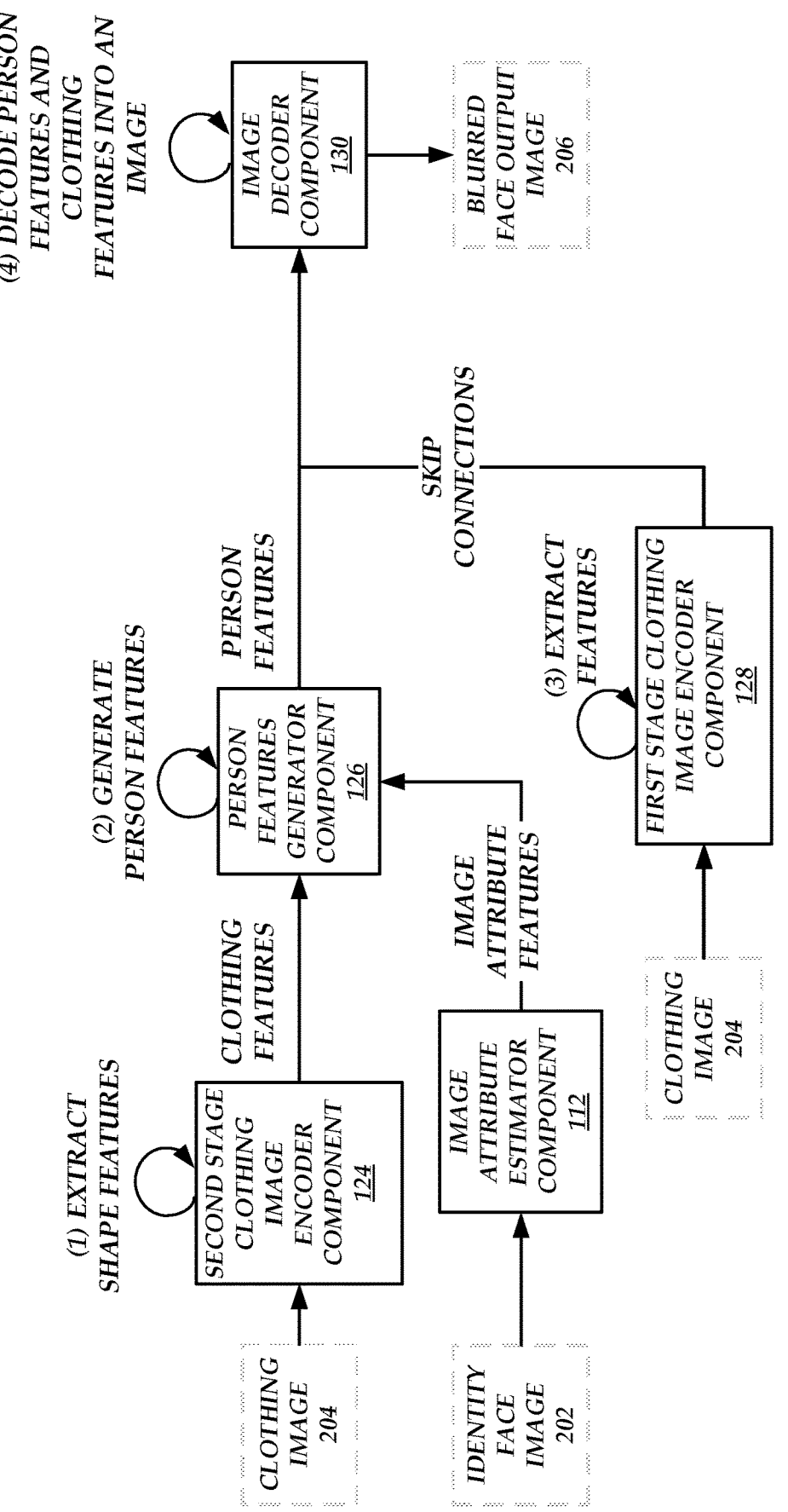
FIG. 3B is a visualization of the environment of FIG. 1 depicting illustrative interactions between the components of the image generator component to generate a blurred face output image, in accordance with aspects of the present application.

FIG. 3A is a visualization of the environment of FIG. 1 depicting illustrative interactions between the components of the person image generator component 114 in order to train the image generator component 114. In one embodiment, the person image generator component 114 may be a latent diffusion model that consists of a VAE encoder-decoder and a U-Net. Illustratively, the image generator component 114 can be trained based on a set of face images (from a finite set of face images) that allows the image generator component to encode person features based on selected individual face images (e.g., known identities). Specifically, as illustrated in FIG. 3B (below), the person features generator component 126 may be trained with person features from a set of images so that the generated outputs from the person features generator component 126 based on clothing features and image attributes as inputs can include person feature attributes trained in the person features generator component 126.

At (1), using the person feature encoder component 122 and the second stage clothing image encoder component 124, the person features generator component 126 is trained on the person features of the person feature encoder component 1122. For purpose of illustration, the clothing features of the second stage clothing image encoder component 124 and the image attribute features of the image attribute estimator component 112 are provided into the person features generator component 126 as inputs.

The person feature encoder component 122 can receive as input a set of person images, illustrated as the person image 302. Illustratively, the person image 302 corresponds to a full body image with blurred face and without articles of clothing. The person feature encoder component 122 can encode the person image 302 into a latent space which may be used for training. As described above, the latent space may correspond to a multi-dimensional space that includes encodings (e.g., multi-dimensional vectors) where similar encodings are positioned closer to each other in the latent space. The person feature encoder component 122 may be a deep generative model, such as a variational autoencoder (VAE).

The person features generator component 126 can receive the extracted clothing features from the second stage clothing image encoder component 124 and receive image attribute features as input. The person features generator component 126 may be a type of convolutional neural network (CNN), such as a U-Net. The second stage clothing image encoder component 124 outputs clothing features extracted from the clothing image 204. The image attribute features may be output from the image attribute estimator component 112 processing the identity face image 202. When running the image attribute estimator component 112, attributes are extracted from the reference face in the identity face image 202 to ensure generation a person of similar attributes (such as the same skin tone). However, in another embodiment, the attributes may be input to the model directly, such as via user input.

Illustratively, the person features may include details of the body wearing the article of clothing, such as color, texture, or shape of the one or more body parts. In one embodiment, the person features generator component 126 may be a U-Net, where the U-Net may be conditioned on the inputs. For example, the U-Net may be conditioned on skin tone as an attribute input to generate features of the person of specific skin tone. During training, the input is clothing and image attribute features. The output of the person feature generator component 126 are person features and these are linked to the person features coming from the person feature encoder 122 via a loss function to estimate the difference. Accordingly, the person features generator component 126 can be trained to generate the person features from the inputs.

FIG. 3B is a visualization of the environment of FIG. 1 depicting illustrative interactions between the components of the person image generator component 114 to generate a blurred face output image 206, in accordance with aspects of the present application. In one embodiment, the person image generator component 114 may be a latent diffusion model that consists of a VAE encoder-decoder and a U-Net.

To begin, the second stage clothing image encoder component 124 takes as input the clothing image 204. The clothing image 204 depicts the article of clothing to be used in the final generated image. The second stage clothing image encoder component 124 extracts shape features from the clothing image 204 at (1). The clothing features may include details regarding the shape of the article of clothing in the clothing image 204. The extracted features may be used to condition the person features generator component 126, in addition to input features, such as skin tone. The person features generator component 126 may be a type of convolutional neural network (CNN), such as a U-Net.

The person features generator component 126 can generate person features at (2) according to clothing shape and input attributes. The person features generator component 126 can receive the extracted clothing features from the second stage clothing image encoder component 124 and receive image attribute features as input. The image attribute features may be output from the image attribute estimator component 112 processing the identity face image 202. When running the image attribute estimator component 112, attributes are extracted from the reference face in the identity face image 202 to ensure generation a person of similar attributes (such as the same skin tone). However, in another embodiment, the attributes may be input to the model directly, such as via user input. The person features may include details of the body wearing the article of clothing, such as color, texture, or shape of the one or more body parts. In one embodiment, the person features generator component 126 may be a U-Net, where the U-Net may be conditioned on the inputs. For example, the U-Net may be conditioned on skin tone as an attribute input to generate features of the person of specific skin tone.

The first stage clothing image encoder component 128 may extract features, both low and high level features, from the clothing image 204 at (3), and output skip connections to the image decoder component 130. The clothing features may include details of the article of clothing, such as color, texture, or shape of the article of clothing. The first stage clothing image encoder component 128 can take as input the same clothing image 204. The first stage clothing image encoder component 128 may be a VAE encoder. The skip connections from the first stage clothing image encoder component 128 to decoder ensure that all clothing details are preserved when the features are decoded. The person image generator component 114 may be trained with reconstruction loss, Generative Adversarial Network (GAN) loss, and smooth latent space loss (KL).

At (4), the image decoder component 130 takes as input the output from the person feature encoder component 122, the person features generator component 126, and the first stage clothing image encoder component 128 and decodes the person features and clothing features (e.g., via skip connections) into an image. The resulting output is a blurred face output image 206. The image decoder component 130 may be a VAE decoder. The blurred face output image 206 may depict the person from the person image 302 wearing the clothing from the clothing image 204 and with the attributes from the image attribute estimator component 112. The blurred face output 206 also has a blurred face. The blurred face output 206 may be eventually used by the final image processing component 120 to create the final output image 208.

The encoder components of the person image generator component 114 may be trained on a large dataset of images containing images with a blurred face. These images may be collected from existing datasets, such as from online e-commerce studios (e.g., JFK13, DEL19, LHR17, HDN14, Shopbop) and from online catalogs (e.g., ww-detail) with all faces being blurred to remove the identity.

Although FIG. 3B illustrates steps (1) and (3) being performed serially (e.g., one after the other), the illustration is provided by way of example only, and is not intended to be limiting or required. In some embodiments, steps (1) and (3) may be performed in parallel (e.g., concurrently), asynchronously, or in some other manner. For example, steps (1) and (3) may be performed in various sequences. In one example, step (1) is performed first, followed by steps (2) and (3), and then step (4). Alternatively, step (3) is performed first, followed by step (1), followed by step (2), and then step (4), etc.

Figure 4B:
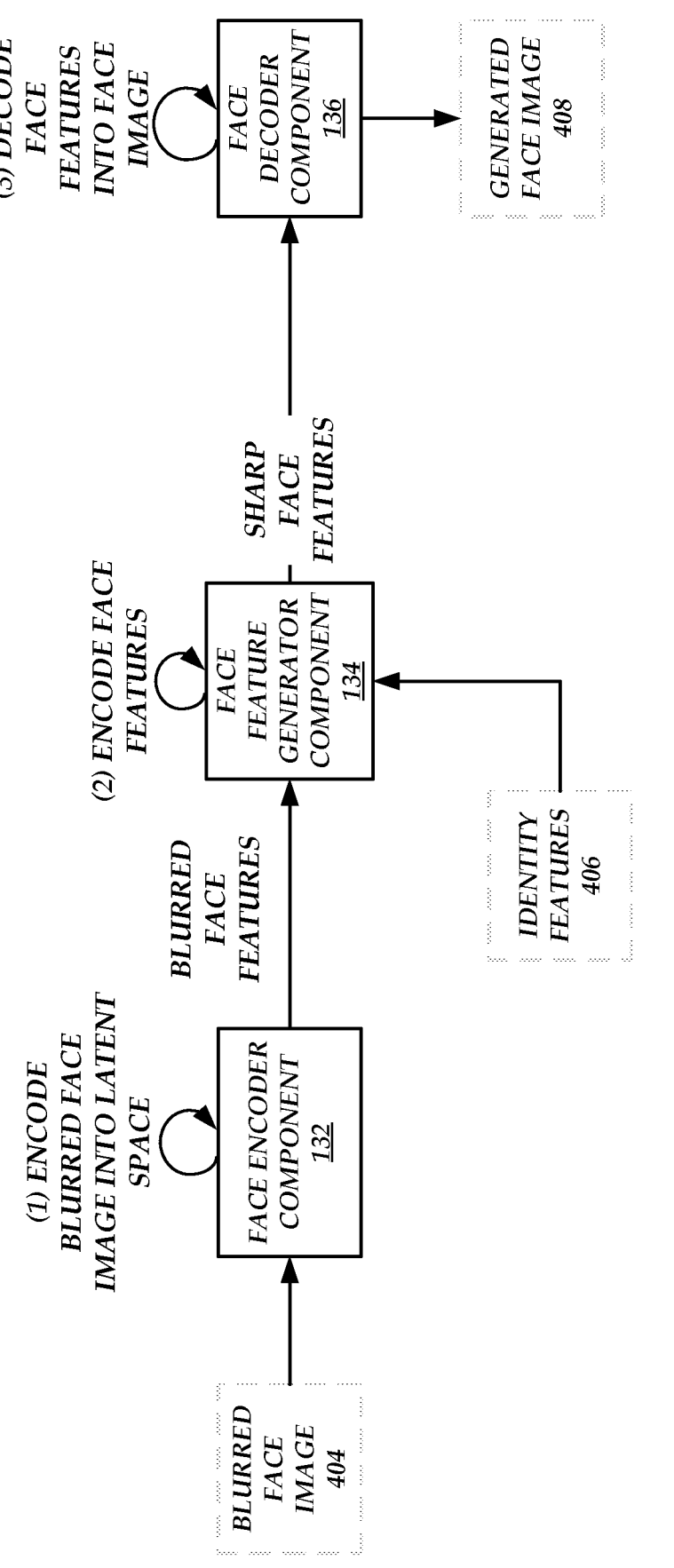
FIG. 4B is a visualization of the environment of FIG. 1 depicting illustrative interactions between the components of the face deblurring component to generate a sharp face image conditioned on the approved identity, in accordance with aspects of the present application.

FIG. 4A is a visualization of the environment of FIG. 1 depicting illustrative interactions between the components of the face deblurring component 116 in order to train the face deblurring component 116, in accordance with aspects of the present application. In one embodiment, the face deblurring component 116 may be a latent diffusion model that consists of a VAE encoder-decoder and a U-Net. The face deblurring component 116 may include the use of various encoders, including the face encoder component 132 and the face feature generator component 134, that encode data into a latent space for processing and then can be decoded as the outputted image using the face decoder component 136. Specifically, as illustrated in FIG. 4B (below), the face feature generator component 134 may be trained with sharp face features from a set of images so that the generated outputs from the face feature generator component 134 based on blurred face features and image attributes as inputs can include sharp face feature attributes trained in the face feature generator component 134. The face feature generator component 134 may be a type of convolutional neural network (CNN), such as a U-Net.

Illustratively, the face feature generator component 134 is trained on the sharp face features from the face encoder component 132 based on the blurred face features from the face encoder component 132 and the identity features 406 as inputs. The face encoder component 132 can also input a blurred face image 404 depicting a blurred version of the cropped identity face image 202. A point in the latent space can then be sampled from the encoding of the blurred face image 404 to get blurred face features. The identity features 406 may include attributes of the selected face image, such as those generated by the image attribute estimator component 112 or input directly by an end user. The attributes may represent certain aspects of the face which the image generation service 110 deblurs to (e.g., a certain skin tone), such as color, texture, or shape of the face.

The face encoder component 132 may take as input a sharp face image 402, where the sharp face image 402 depicts a cropped version of the identity face image 202 (e.g., the face region of the image cropped a few pixels around the face). A point in the latent space can then be sampled from the encoding of the sharp face image 402 to get sharp face features, which can be used to condition the face feature generator component 134. The face encoder component 132 may be a deep generative model, such as a VAE encoder. During training, the input is blurred face features and image attribute features. The output of the face feature generator component 134 are sharp face features and these are linked to the sharp face features coming from the face encoder component 132. Accordingly, the face feature generator component 134 can be trained to generate the sharp face features from the inputs.

FIG. 4B is a visualization of the environment of FIG. 1 depicting illustrative interactions between the components of the face deblurring component 116 to generate a sharp face image 408 conditioned on the approved identity, in accordance with aspects of the present application. In one embodiment, the face deblurring component 116 may be a latent diffusion model that consists of a VAE encoder-decoder and a U-Net. The face deblurring component 116 may include the use of various encoders, including the face encoder component 132 and the face feature generator component 134, that encode data into a latent space for processing and then can be decoded as the outputted image using the face decoder component 136.

At (1), the face encoder component 132 can encode the blurred face image 404 into the latent space. The face encoder component 132 can also take as input a blurred face image 404 depicting a blurred version of the cropped identity face image 202. A point in the latent space can then be sampled from the encoding of the blurred face image 404 to get blurred face features.

The face feature generator component 134 can deblur the blurred face features into features of a sharp face at (2) according to the identity features 406. The blurred face features, along with identity features 406, can be used as conditions to the face feature generator component 134. The identity features 406 may include attributes of the selected face image, such as those generated by the image attribute estimator component 112 or input directly by an end user. The attributes may represent certain aspects of the face which the image generation service 110 deblurs to (e.g., a certain skin tone), such as color, texture, or shape of the face. The face feature generator component 134 may be a type of convolutional neural network (CNN), such as a U-Net.

The sharp face features from the face feature generator component 134 and the face encoder component 132 may be passed then to the face decoder component 136 to decode the features into a face image at (3). As a result, the face decoder component 136 can generate a sharp face image 408 associated with the approved identity. The sharp face image 408 may be used by the final image processing component 120 to create the final output 208, as depicted in FIG. 2. In one embodiment, the face decoder component 136 may be a VAE decoder.

In some embodiments, the face deblurring component 116 may be trained with reconstruction loss, GAN loss, and smooth latent space loss (KL).

The face deblurring component 116 may be trained using a certain number of unique identities, where each identity has a certain number of images associated with the given identity. In cases where there are a small number of unique identities and corresponding images, there may be a limited number of images to be used for training data. For example, there may be 40 unique identities available for use, where each identity has 20 images. This results in a total of 800 images as training data.

In some embodiments, to generate more variations of these faces, a face augmentation approach may be used to deform the face (e.g., using perspective transformation) and modify the hair. The face augmentation approach may search for a face image of a similar pose to the face of the approved identity in the database of real faces and select that face image. Then, the approach may extract the homography of the two faces (e.g., the approved identity face and the selected face) and apply perspective transformation to deform the identity face. At this point, the approach can integrate the hair associated with the original face into the deformed face, resulting in an additional pose for that identity to be used for training. In one embodiment, this augmentation technique may be applied offline to extract more variations of the input face.

Figure 5A:
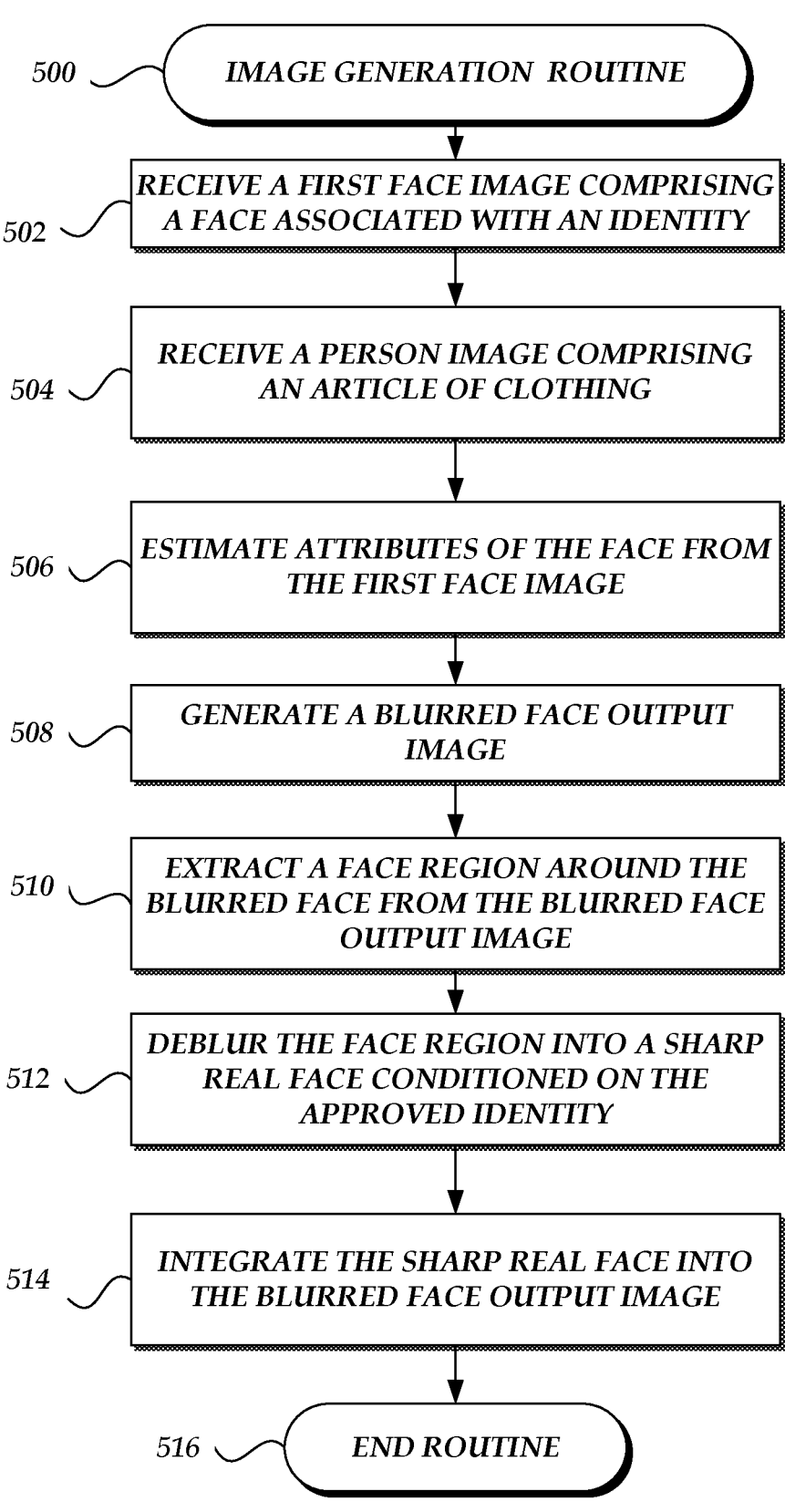
FIG. 5A is a flow diagram illustrative of a routine for generating an image conditioned on the approved identity, in accordance with aspects of the present application.

FIG. 5A illustrates an example routine 500 for generating an image of an approved identity wearing an article of clothing, in accordance with some embodiments of the present disclosure. The routine 500 may be executed by the image generation service 110 and various components of the computing environment 100. Specifically, routine 500 may be executed by a processor, not shown, of the computing devices 102.

The routine 500 may begin automatically upon initiating a device (e.g., an image generation service 110), or may be initiated by a client or end-user on an ad hoc basis and off-line. The client or end-user may use an interactive system to initiate the routine 500. For example, a client or end-user may request the generation of the image when desired by the client or end-user using the interactive system. The routine 500 may also be initiated automatically based on a routine schedule (e.g., every hour, day, or week, etc.), in response to a triggering event, or both. For example, a routine schedule may set the routine 500 to automatically be performed every week and therefore, the routine 500 may be performed every week according to the set schedule. Additionally, a triggering event, for example, may be a new identity event, an identity update event, new clothing image event, clothing image update event, etc., where an event occurrence in the network triggers initiation of the routine 500.

The routine 500 may be embodied in a set of executable program instructions stored on a computer-readable medium, such as one or more disk drives of a computing system of a node or a server. When the routine 500 is initiated, the executable program instructions can be loaded into memory, such as random access memory ("RAM"), and executed by one or more processors of a computing system, such as the image generation service 110 shown in FIG. 6.

The example routine 500 begins at block 502, where the image generation service 110 receives a first face image comprising a selected face image. The first face image may depict an image of the face of an approved identity selected for image generation, such as the identity face image 202 of FIG. 2.

At block 504, the image generation service 110 receives a person image depicting an article of clothing and a model wearing the article of clothing. The person image may depict the body parts of a person or body that is wearing the article of clothing and has a blurred face, such as the person image 302 of FIG. 3A. The person image may have the portion of the body covered by the article of clothing cut out from the image to be used to generate person features, such as with the person feature encoder component 122 of FIG. 3A. The article of clothing may correspond to the article of clothing that will be generated with the selected approved identity associated with the first face image from block 502, such as the clothing image 204 of FIG. 2.

At block 506, the image generation service 110 estimates attributes of the face from the first face image. For example, attributes from the first face image may include color (e.g., RGB skin tone), texture, or shape of the face.

At block 508, the image generation service 110 generates a blurred face output image. The image generation service 110 may generate the blurred face output image, for example, using the person image generator component 114 of FIG. 2 and as described with respect to FIG. 3A-B. The blurred face output image may be an image of a person wearing the clothing from the clothing image received at block 506 with a blurred face, such as the blurred face output 206 of FIG. 2.

The blurred face output image may be generated using a series of steps, starting with encoding the person image into a latent space, such as by using a variational autoencoder (VAE). The person image is then encoded to extract shape features that include details of the shape of the article of clothing from the latent space. Person features may also be generated using a U-Net based on the estimated attributes of the face and the shape features. The person features may include details of the model wearing the article of clothing from the latent space. The person image may also be encoded using a second VAE encoder to extract from the latent space clothing features including details of the article of clothing. The various features from the latent space may then be decoded using a VAE decoder to generate the resulting blurred face output image.

At block 510, the image generation service 110 extracts a face region around the blurred face from the blurred face output image. The extracted face region may include the few pixels around the face for further context. The image generation service 110 may extract the face region using semantic segmentation.

At block 512, the image generation service 110 deblurs the face region into a sharp real face conditioned on the approved identity. The image generation service 110 may deblur the face region into a sharp real face using, for example, the face deblurring component 116 of FIG. 2 and as described with respect to FIG. 4A-B. The resulting image may be a clear image of a selected face image.

The sharp face output image may be generated using a series of steps, starting with encoding the face region from the blurred face output image into a latent space, such as by using a variational autoencoder (VAE), to extract blurred face features that include details of the blurred face from the latent space. The first face image may also be encoded using another VAE encoder to extract from the latent space sharp face features including details of the face. The various features from the latent space may then be decoded using a VAE decoder to generate the resulting sharp face output image.

At block 514, the image generation service 110 integrates (or combines) the sharp real face into the person blurred face output image. The image generation service 110 may integrate the sharp real face using, for example, the final image processing component 120 of FIG. 2, and generate a final output image, such as the final output 208. The final output image may depict the selected face of the identity wearing the article of clothing.

At block 516, the routine ends.

Although FIG. 5A illustrates blocks 502, 504, 506, and 508 being performed serially (e.g., one after the other), the illustration is provided by way of example only, and is not intended to be limiting or required. In some embodiments, blocks 502, 504, 506, and 508 may be performed in parallel (e.g., concurrently), asynchronously, or in some other manner. For example, blocks 502, 504, 506, and 508 may be performed in various sequences. In one example, block 506 is performed first, followed by block 504, followed by block 502, and then block 508. Alternatively, block 504 is performed first, followed by block 506, followed by block 502 and then block 508, etc.

Figure 5B:
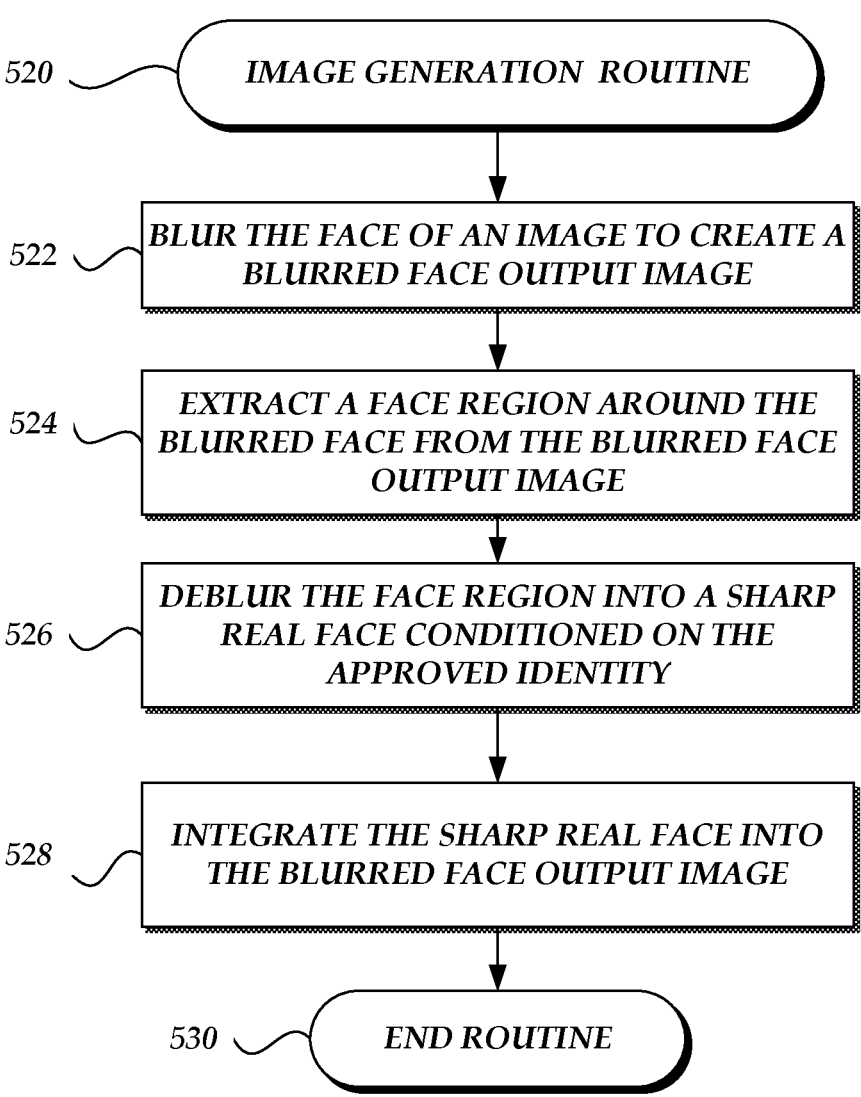
FIG. 5B is a flow diagram illustrative of an alternative routine for generating an image conditioned on the approved identity, in accordance with aspects of the present application.

FIG. 5B is a flow diagram illustrative of an alternative routine 520 for generating an image conditioned on the approved identity, in accordance with aspects of the present application. The routine 520 may be executed by the image generation service 110 and various components of the computing environment 100. Specifically, routine 520 may be executed by a processor, not shown, of the computing devices 102.

The routine 520 may begin automatically upon initiating a device (e.g., an image generation service 110), or may be initiated by a client or end-user on an ad hoc basis and off-line. The client or end-user may use an interactive system to initiate the routine 520. For example, a client or end-user may request the generation of the image when desired by the client or end-user using the interactive system. The routine 520 may also be initiated automatically based on a routine schedule (e.g., every hour, day, or week, etc.), in response to a triggering event, or both. For example, a routine schedule may set the routine 520 to automatically be performed every week and therefore, the routine 520 may be performed every week according to the set schedule. Additionally, a triggering event, for example, may be a new identity event, an identity update event, new clothing image event, clothing image update event, etc., where an event occurrence in the network triggers initiation of the routine 520.

The routine 520 may be embodied in a set of executable program instructions stored on a computer-readable medium, such as one or more disk drives of a computing system of a node or a server. When the routine 520 is initiated, the executable program instructions can be loaded into memory, such as random access memory ("RAM"), and executed by one or more processors of a computing system, such as the image generation service 110 shown in FIG. 6.

The example routine 520 begins at block 522, where the image generation service 110 blurs the face of an image to create a blurred face output image. The blurred face output image may be an image of a person wearing an article of clothing with a blurred face.

At block 524, the image generation service 110 extracts a face region around the blurred face from the blurred face output image. The extracted face region may include the few pixels around the face for further context. The image generation service 110 may extract the face region using semantic segmentation.

At block 526, the image generation service 110 deblurs the face region into a sharp real face conditioned on the approved identity. The image generation service 110 may deblur the face region into a sharp real face using, for example, the face deblurring component 116 of FIG. 2 and as described with respect to FIG. 4B. The resulting image may be a clear image of a selected face image.

The sharp face output image may be generated using a series of steps, starting with encoding the face region from the blurred face output image into a latent space, such as by using a variational autoencoder (VAE), to extract blurred face features that include details of the blurred face from the latent space. The first face image may also be encoded using another VAE encoder to extract from the latent space sharp face features including details of the face. The various features from the latent space may then be decoded using a VAE decoder to generate the resulting sharp face output image.

At block 528, the image generation service 110 integrates (or combines) the sharp real face into the person blurred face output image. The image generation service 110 may integrate the sharp real face using, for example, the final image processing component 120 of FIG. 2, and generate a final output image, such as the final output 208. The final output image may depict the selected face of the identity wearing the article of clothing.

At block 530, the routine ends.

Figure 6:
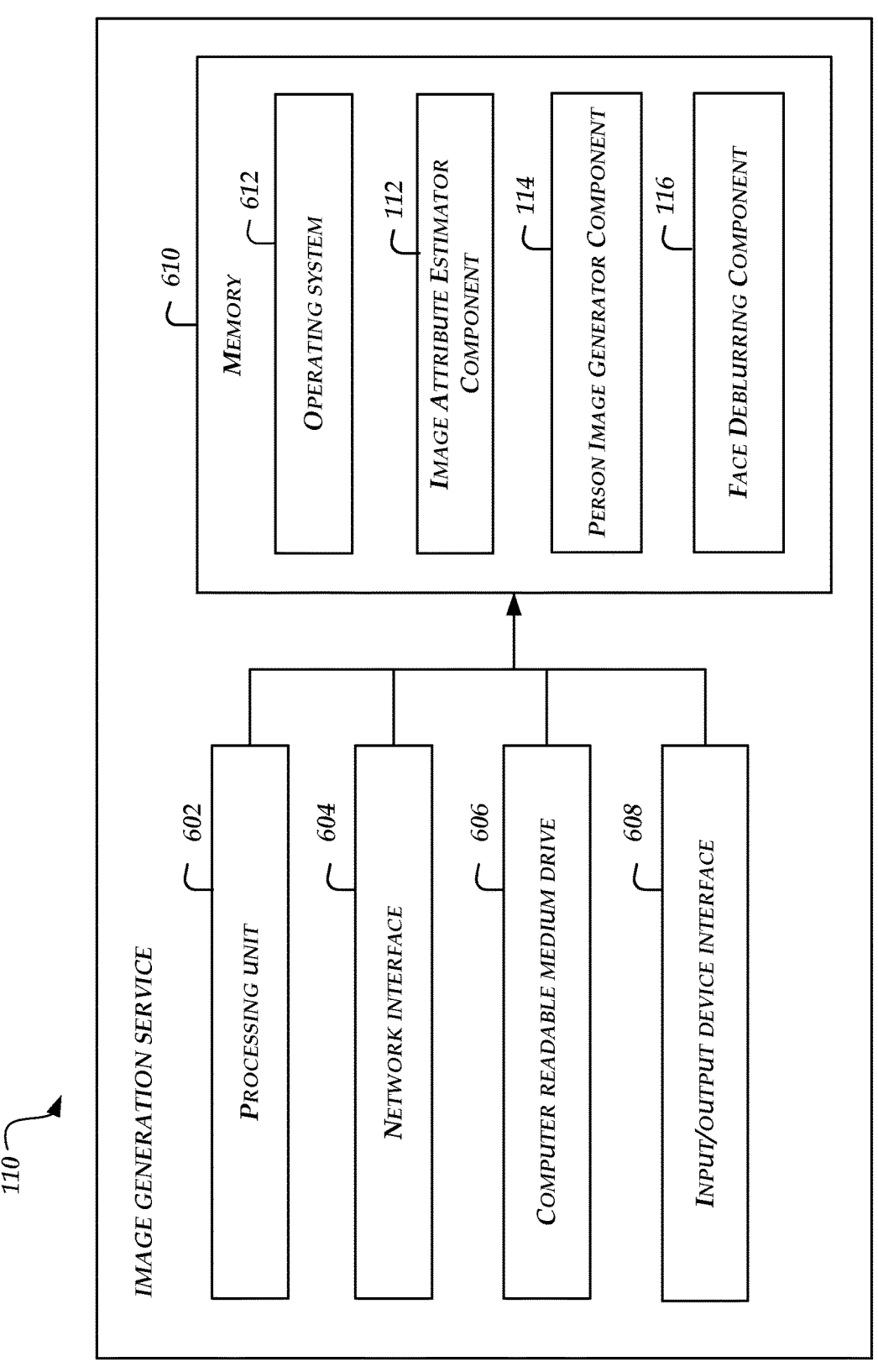
FIG. 6 is a block diagram of an illustrative architecture of the image generation service, in accordance with aspects of the present application.

FIG. 6 depicts an example architecture of a computing system that can be used to perform one or more of the techniques described herein or illustrated in FIGS. 1-5. The general architecture of the image generation service 110 depicted in FIG. 6 includes an arrangement of computer hardware and software modules that may be used to implement one or more aspects of the present disclosure. The image generation service 110 may include many more (or fewer) elements than those shown in FIG. 6. It is not necessary, however, that all of these elements be shown in order to provide an enabling disclosure. As illustrated, the image generation service 110 includes a processing unit 602, a network interface 604, a computer readable medium drive 606, and an input/output device interface 608, all of which may communicate with one another by way of a communication bus. The network interface 604 may provide connectivity to one or more networks or computing systems. The processing unit 602 may thus receive information and instructions from other computing systems or services via a network (e.g., connecting the image generation service 110 and the environment 100).

The processing unit 602 may also communicate with memory 610. The memory 610 may contain computer program instructions (grouped as modules or units in some embodiments) that the processing unit 602 executes in order to implement one or more aspects of the present disclosure. The memory 610 may include random access memory (RAM), read only memory (ROM), and/or other persistent, auxiliary, or non transitory computer readable media. The memory 610 may store an operating system 612 that provides computer program instructions for use by the processing unit 602 in the general administration and operation of the image generation service 110. The memory 610 may further include computer program instructions and other information for implementing one or more aspects of the present disclosure. For example, in one embodiment, the memory 610 includes a user interface module that generates user interfaces (and/or instructions therefor) for display upon a user computing device, e.g., via a navigation and/or browsing interface such as a browser or application installed on the user computing device.

In addition to and/or in combination with the operating system 612, the memory 610 includes an image attribute estimator component 112, a person image generator component 114, and a face deblurring component 116, which may implement the functionality of the present disclosure.

While the image attribute estimator component 112, the person image generator component 114, and the face deblurring component 116 are shown in FIG. 6 is part of the image generation service 110, in other embodiments, all or a portion of the components may be implemented by another computing device. For example, in certain embodiments of the present disclosure, another computing device in communication the image generation service 110 may include several modules or components that operate similarly to the modules and components illustrated as part of the image generation service 110. In some instances, the components may be implemented as one or more virtualized computing devices. Moreover, components may be implemented in whole or part as a distributed computing system, including a collection of devices that collectively implement the functions discussed herein.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Some or all of the analysis methods described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, micro-controller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    an image attribute estimator module implemented on a first processor in communication with a first memory, wherein the processor is to execute specific computer-executable instructions to receive a first face image depicting a face and associated with an identity and generate a set of estimated attributes of the first face image;
    a person image generator module implemented on a second processor in communication with a second memory, wherein the processor is to execute specific computer-executable instructions to:

receive a clothing image depicting an article of clothing;

encode, using a clothing image encoder, the clothing image in order to extract one or more shape features comprising first details of the shape of the article of clothing;

generate, using a first U-Net encoder, one or more person features, wherein the one or more person features comprise second details of a model wearing the article of clothing;

encode, using a second VAE encoder, a person image to extract one or more clothing features from the person image, wherein the one or more clothing features comprise third details of the article of clothing; and decode, using a first VAE decoder, the one or more person features and the one or more clothing features to generate a blurred face output, wherein the blurred face output depicts the model wearing the article of clothing and having a blurred face portion;

a face deblurring module implemented on a third processor in communication with a third memory, wherein the processor is to execute specific computer-executable instructions to:

encode, using a third VAE encoder, the blurred face output to extract one or more blurred face features;

encode, using a second U-Net encoder, the one or more blurred face features to extract one or more sharp face features conditioned on the identity; and decode, using a second VAE decoder, the one or more sharp face features to generate a second face image depicting a sharp face conditioned on the identity; and a final image processing module implemented on a fourth processor in communication with a fourth memory, wherein the processor is to execute specific computer-executable instructions to combine the generated second face image with the blurred face output to generate a final image depicting the identity wearing the article of clothing.

2. The system of claim 1, wherein the set of estimated attributes of the first face image comprises one or more of color, texture, or shape of the face.

3. The system of claim 1, wherein the one or more person features further comprise one or more of color, texture, or shape of one or more body parts of the model.

4. The system of claim 1, wherein the one or more clothing features comprise one or more of color, texture, or shape of the article of clothing.

5. The system of claim 1, wherein first dimensions of the second face image are adjusted to fit second dimensions of a face region of the blurred face output.

6. A computer-implemented method comprising:

receiving a first face image depicting a face associated with an identity;

receiving a clothing image depicting an article of clothing;

estimating attributes of the face from the first face image;

generating a blurred face output image based on encodings of the clothing image and the estimated attributes of the face, wherein the blurred face output image depicts a model with a blurred face wearing the article of clothing;

extracting a face region around the blurred face from the blurred face output image using semantic segmentation;

deblurring the face region into a sharp real face conditioned on the identity; and combining the sharp real face into the blurred face output image.

7. The computer-implemented method of claim 6, wherein encodings of the clothing image comprise one or more person features comprising one or more clothing features comprising one or more of color, texture, or shape of the article of clothing.

8. The computer-implemented method of claim 6, wherein attributes of the face include one or more of color, texture, or shape of the face.

9. The computer-implemented method of claim 6, wherein deblurring the face region comprises:

encoding the blurred face output image to extract one or more blurred face features using a first VAE encoder;

encoding the first face image to extract one or more sharp face features using a U-Net encoder; and decoding the one or more sharp face features using a VAE decoder.

10. The computer-implemented method of claim 6, wherein the face region is deblurred based on the estimated attributes of the face.

11. The computer-implemented method of claim 6, further comprising:

receiving a second face image comprising a second face;

accessing a set of face images associated with the identity;

determining a third face image from the set of face images with a similar pose to the second face image;

extracting a homography of the second face image and the third face image;

applying perspective transformation to the homography to deform the third face image; and integrating the second face image onto the deformed third face image.

12. The computer-implemented method of claim 6, wherein the sharp real face conditioned on the identity is based on encoding a set of face images including the first face image using an encoder.

13. The computer-implemented method of claim 12, wherein the clothing image is encoded using a first clothing image encoder to extract one or more clothing shape features and using a second clothing image encoder to extract one or more clothing features.

14. The computer-implemented method of claim 13, wherein generating the blurred face output image comprises:

generating, using a U-Net, one or more person features based on the one or more clothing shape features and the estimated attributes of the face; and decoding the one or more person features and the one or more clothing features to generate the blurred face output using a VAE decoder.

15. A non-transitory computer-readable medium storing computer-executable instructions that, when executed by a processor of a computing device, cause the computing device to at least:

estimate attributes of a face associated with an identity from a first face image depicting the face;

generate a blurred face output image based on the estimated attributes of the face and encodings of a clothing image depicting an article of clothing, wherein the blurred face output image depicts a model with a blurred face wearing the article of clothing;

extract a face region around the blurred face from the blurred face output image using semantic segmentation;

deblur the face region into a sharp real face conditioned on the identity; and integrate the sharp real face into the blurred face output image.

16. The non-transitory computer-readable medium of claim 15, wherein the first face image and the clothing image are received as input.

17. The non-transitory computer-readable medium of claim 15, wherein encodings of the clothing image comprise one or more person features comprising one or more of color, texture, or shape of one or more body parts and one or more clothing features comprising one or more of color, texture, or shape of the article of clothing.

18. The non-transitory computer-readable medium of claim 15, wherein attributes of the face include one or more of color, texture, or shape of the face.

19. The non-transitory computer-readable medium of claim 15, wherein deblurring the face region comprises:

encode the blurred face output to extract one or more blurred face features using a first VAE encoder;

encode the first face image to extract one or more sharp face features using a second VAE encoder; and decode the one or more blurred face features and the one or more sharp face features using a VAE decoder.

20. The non-transitory computer-readable medium of claim 15, wherein the face region is deblurred based on the estimated attributes of the face.

21. The non-transitory computer-readable medium of claim 15, further comprising:

receive a second face image comprising a second face and hair;

access a set of face images associated with the identity;

determine a third face image from the set of face images with a similar pose to the second face image;

extract a homography of the second face image and the third face image;

apply perspective transformation to the homography to deform the third face image; and integrate the hair of the second face image onto the deformed third face image.

22. The non-transitory computer-readable medium of claim 15, wherein the sharp real face conditioned on the identity is based on encoding a set of face images including the first face image using an encoder.

23. The non-transitory computer-readable medium of claim 22, wherein the clothing image is encoded using a first clothing image encoder to extract one or more clothing shape features and using a second clothing image encoder to extract one or more clothing features.

24. The non-transitory computer-readable medium of claim 23, wherein generating the blurred face output image comprises:

generate, using a U-Net, one or more person features based on the one or more clothing shape features and the estimated attributes of the face; and decode the one or more person features and the one or more clothing features to generate the blurred face output using a VAE decoder.

* * * * *